United States Patent
Miyake et al.

(10) Patent No.: US 12,252,144 B2
(45) Date of Patent: Mar. 18, 2025

(54) MANAGER, ELECTRONIC CONTROL UNIT, SYSTEM, CONTROL METHOD, STORAGE MEDIUM, VEHICLE, AND CONTROL APPARATUS

(71) Applicants: TOYOTA JIDOSHA KABUSHIKI KAISHA, Toyota (JP); ADVICS CO., LTD., Kariya (JP)

(72) Inventors: Kazuki Miyake, Okazaki (JP); Yusuke Suetake, Toyota (JP); Atsushi Kuchinomachi, Tokyo (JP)

(73) Assignees: TOYOTA JIDOSHA KABUSHIKI KAISHA, Toyota (JP); ADVICS CO., LTD., Kariya (JP)

( * ) Notice: Subject to any disclaimer, the term of this patent is extended or adjusted under 35 U.S.C. 154(b) by 389 days.

(21) Appl. No.: 17/690,599

(22) Filed: Mar. 9, 2022

(65) Prior Publication Data
US 2022/0289219 A1 Sep. 15, 2022

(30) Foreign Application Priority Data
Mar. 11, 2021 (JP) ................. 2021-039545

(51) Int. Cl.
*B60W 50/06* (2006.01)
*B60W 10/04* (2006.01)
*B60W 10/18* (2012.01)

(52) U.S. Cl.
CPC .......... *B60W 50/06* (2013.01); *B60W 10/04* (2013.01); *B60W 10/18* (2013.01); *B60W 2720/106* (2013.01)

(58) Field of Classification Search
CPC ...... B60W 50/06; B60W 10/04; B60W 10/18; B60W 2720/106; B60W 2050/0091; B60W 10/184; B60W 30/18; B60W 50/0098; B60W 10/06; B60W 50/00; B60W 2050/0005
See application file for complete search history.

(56) References Cited

U.S. PATENT DOCUMENTS

| | | | |
|---|---|---|---|
| 10,173,722 B2* | 1/2019 | Pourrezaei Khaligh | ..................... B60D 1/62 |
| 10,377,375 B2* | 8/2019 | Jones | ............... B60W 30/18163 |
| 2019/0146516 A1* | 5/2019 | Eshima | .................. G08G 1/143 701/23 |
| 2020/0070849 A1 | 3/2020 | Suzuki et al. | |

FOREIGN PATENT DOCUMENTS

JP 2020-032894 A 3/2020

* cited by examiner

*Primary Examiner* — Calvin Cheung
(74) *Attorney, Agent, or Firm* — Oliff PLC

(57) ABSTRACT

A manager installed in a vehicle includes: a first accepting unit that accepts a plurality of kinematic plans from a plurality of ADAS applications; an arbitration unit that arbitrates the kinematic plans; a calculation unit that calculates a motion request based on an arbitration result by the arbitration unit; and a distribution unit that distributes the motion request to at least one actuator system, wherein the first accepting unit accepts information relating to the actuator system to which the distribution unit distributes the motion request from the ADAS applications, along with the kinematic plans.

11 Claims, 3 Drawing Sheets

MANAGER, ELECTRONIC CONTROL UNIT, SYSTEM, CONTROL METHOD, STORAGE MEDIUM, VEHICLE, AND CONTROL APPARATUS

CROSS-REFERENCE TO RELATED APPLICATION

This application claims priority to Japanese Patent Application No. 2021-039545 filed on Mar. 11, 2021, incorporated herein by reference in its entirety.

BACKGROUND

1. Technical Field

The present disclosure relates to a manager installed in a vehicle, an electronic control unit installed in a vehicle, a system, a control method, a storage medium, a vehicle, and a control apparatus installed in a vehicle.

2. Description of Related Art

In recent years, a plurality of advanced driver assistance system (ADAS) applications that realize automatic driving functions, such as automatic driving and automatic parking, have been implemented in vehicles. Japanese Unexamined Patent Application Publication No. 2020-032894 (JP 2020-032894 A) discloses a manager (control device) that accepts requests output from each of these ADAS applications, arbitrates a plurality of requests accepted from the ADAS applications, and based on the arbitration results, outputs a request for driving an actuator system (systems including powertrain actuators, brake actuators, and so forth).

SUMMARY

The manager determines a request to be employed as an arbitration result according to a predetermined selection criterion (e.g., Min selection) based on the magnitude relationship of the requests accepted from the ADAS applications. However, the manager does not comprehend which actuator system is appropriate to drive in order to realize the requests of each of the ADAS applications. Therefore, when any ADAS application requests a kinematic plan that cannot be realized in the current vehicle situation, there has been concern that the kinematic plan of such an ADAS application might be employed as an arbitration result based on the magnitude relationship of the requests.

The present disclosure has been made in view of the above problem, and it is an object of the present disclosure to provide a manager or the like that can comprehend an actuator system that is appropriate to drive in order to realize the requests of each of the ADAS applications.

An aspect of the present disclosure relates to a manager installed in a vehicle. The manager includes: a first accepting unit that accepts a plurality of kinematic plans from a plurality of ADAS applications; an arbitration unit that arbitrates the kinematic plans; a calculation unit that calculates a motion request based on an arbitration result by the arbitration unit; and a distribution unit that distributes the motion request to at least one actuator system. The first accepting unit accepts information relating to the actuator system to which the distribution unit distributes the motion request from the ADAS applications, along with the kinematic plans.

An aspect of the present disclosure relates to a vehicle in which the manager described above may be installed.

An aspect of the present disclosure relates to an electronic control unit that is installed in a vehicle and that implements one or more ADAS applications. The electronic control unit includes an output unit that outputs, to a manager, a kinematic plan of the ADAS application and information regarding an actuator system to be permitted for use to realize the kinematic plan.

An aspect of the present disclosure relates to a system. The system includes a plurality of ADAS applications implemented in one or more electronic control units installed in a vehicle, and a manager. The one or more electronic control units include an output unit that outputs, to the manager, a plurality of kinematic plans requested by the ADAS applications. The manager includes: an accepting unit that accepts the kinematic plans from the ADAS applications, an arbitration unit that arbitrates the kinematic plans, a calculation unit that calculates a motion request based on an arbitration result by the arbitration unit, and a distribution unit that distributes the motion request to at least one actuator system; and the accepting unit accepts information relating to the actuator system to which the distribution unit distributes the motion request from the ADAS applications, along with the kinematic plans.

An aspect of the present disclosure relates to a control method executed by a computer of a manager installed in a vehicle including at least one actuator system. The control method includes: accepting each of kinematic plans and information regarding an actuator system to be used to realize the kinematic plans, from a plurality of ADAS applications; performing arbitration of the kinematic plans; calculating a motion request based on a result of the arbitration; and distributing the motion request to the at least one actuator system based on the information.

An aspect of the present disclosure relates to a computer-readable non-transitory storage medium storing a program. When the program is executed by a computer of a manager installed in a vehicle including at least one actuator system, the program causes the computer to: accept each of kinematic plans and information regarding an actuator system to be used to realize the kinematic plans, from a plurality of ADAS applications; perform arbitration of the kinematic plans; calculate a motion request based on a result of the arbitrating; and distribute the motion request to the at least one actuator system based on the information.

An aspect of the present disclosure relates to a control apparatus installed in a vehicle. The control apparatus includes one or more processors. The one or more processors are configured to: accept a plurality of kinematic plans from a plurality of ADAS applications; perform arbitration of the kinematic plans; calculate a motion request based on an arbitration result of the arbitration; and distribute the motion request to at least one actuator system. The one or more processors are configured to accept information relating to the actuator system to which the motion request is distributed, along with the kinematic plans.

According to the present disclosure, information regarding the actuator system to which the distributing unit distributes the motion request is accepted from the ADAS applications along with the kinematic plans, and accordingly the manager can comprehend the actuator system regarding which driving is appropriate in order to realize the request of each ADAS application.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A manager according to the present disclosure accepts kinematic plans, and information regarding actuators to be permitted to be used to realize the kinematic plans, from applications. Based on the kinematic plans and the information, and a driving force lower limit of a powertrain actuator, the manager then restricts requests of applications requesting kinematic plans that cannot be realized in the current vehicle situation, before performing arbitration. Thus, the manager can comprehend which actuator system is appropriate to drive in order to realize the requests of each of the applications, and also can appropriately arbitrate the kinematic plans requested by the applications. An embodiment of the present disclosure will be described below in detail with reference to the drawings.

Embodiment

Configuration

Figure 1:
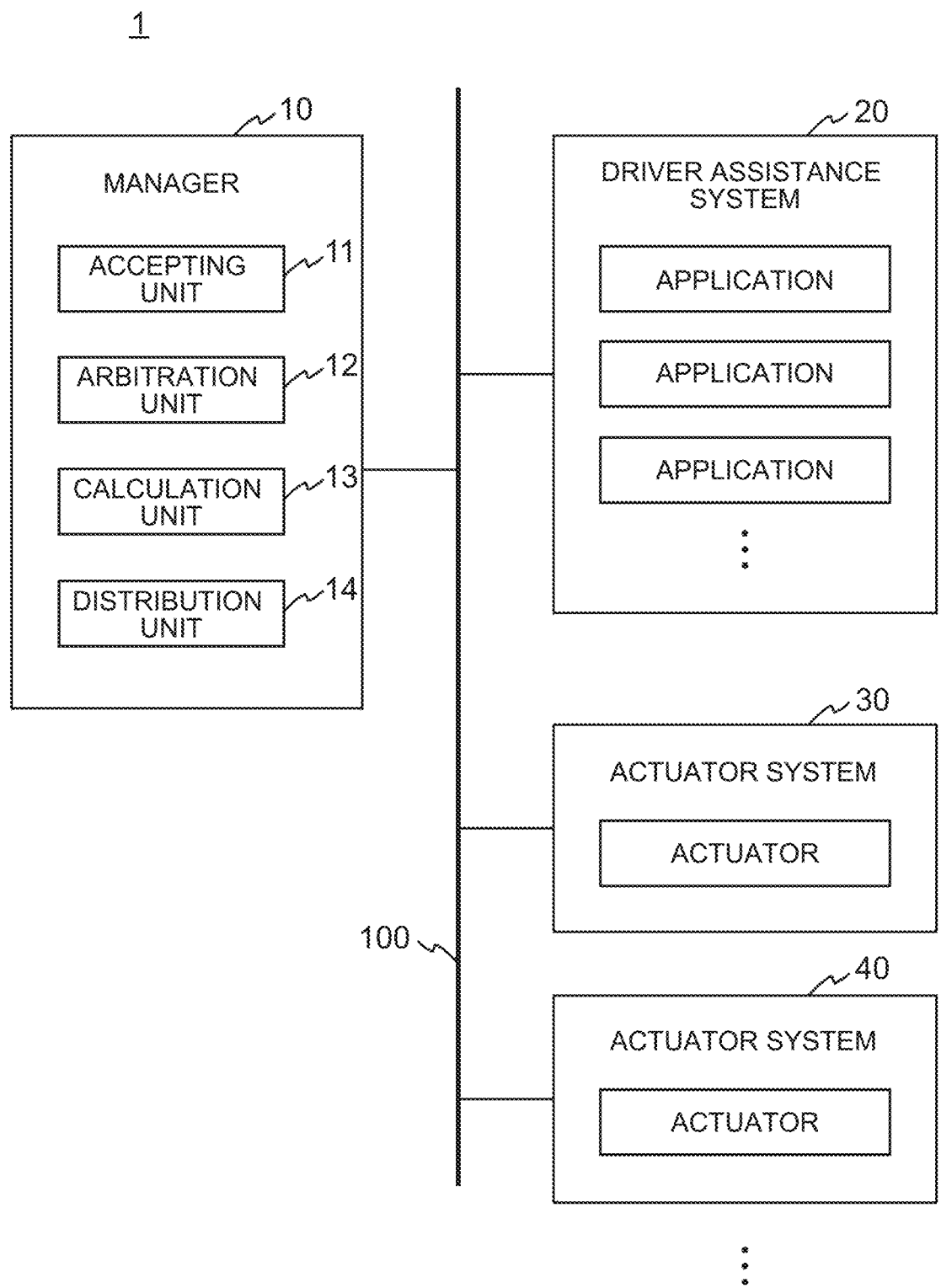
FIG. 1 is a schematic diagram illustrating a configuration example of a system according to an embodiment of the present disclosure.

FIG. 1 is a schematic diagram illustrating a configuration example of a system 1 installed in a vehicle according to the embodiment of the present disclosure. The system 1 illustrated in FIG. 1 includes a manager 10, a driver assistance system 20, and a plurality of actuator systems 30 and 40. Each configuration included in the system 1 is communicably connected via an in-vehicle network 100. Examples of the in-vehicle network 100 include a Controller Area Network (CAN), Ethernet (registered trademark), and so forth.

The driver assistance system 20 is a configuration for realizing various types of functions for assisting driving of the vehicle, including at least drive control and braking control of the vehicle, by executing implemented applications. Examples of applications implemented in the driver assistance system 20 include an automatic driving application that realizes automatic driving functions, an automatic parking application that realizes automatic parking functions, an advanced driver assistance system (ADAS) application that realizes advanced driver assistance functions, and so forth. ADAS applications include applications that realize functions of collision avoidance assistance (pre-crash safety (PCS), etc.), applications that realize functions of following the vehicle in front (adaptive cruise control (ACC), etc.) for travelling while keeping the distance between the vehicle travelling ahead and the vehicle constant, applications that realize functions of lane keeping assistance (lane keeping assist (LKA), lane tracing assist (LTA), etc.) for maintaining the lane that the vehicle is traveling in, applications that realize functions of collision damage mitigation braking (automated emergency braking (AEB), etc.) for automatically braking to reduce damage in a collision, applications that realize functions of lane departure warning (LDW) (lane departure alert (LDA), etc.) for warning of the vehicle deviating from the lane that the vehicle is traveling in, and so forth.

Each application of the driver assistance system 20 outputs a request for a kinematic plan guaranteeing functionality (merchantability) of the application alone to the manager 10, as an application request, based on vehicle information (recognition sensor information, etc.) acquired (input) from various types of sensors and so forth that are omitted from illustration. This kinematic plan includes a request regarding front-rear acceleration/deceleration generated in the vehicle, and so forth. Also, each application of the driver assistance system 20 can output identification information (application ID), which can uniquely identify its own application, to the manager 10 along with the kinematic plan. The application ID is uniquely set in advance for each application. Further, each application of the driver assistance system 20 outputs information regarding the actuators to be permitted for use in realizing its own kinematic plan to the manager 10. This information is also a distribution instruction that instructs a later-described distribution unit 14 of the manager 10 of the actuator to which the motion request is to be distributed. This distribution instruction will be described later.

The driver assistance system 20 is realized by a computer such as an electronic control unit (ECU) having a processor such as a control processing unit (CPU), memory, and an input/output interface (output unit). Note that the number of ECUs making up the driver assistance system 20 and the number of applications implemented by the ECUs are not limited in particular. Also, a separate ECU may be provided for each application in the driver assistance system 20. For example, the driver assistance system 20 may be configured by an automatic driving ECU in which an automatic driving application is implemented, an automatic parking ECU in which an automatic parking application is implemented, and an ADAS-ECU in which an advanced driver assistance application is implemented. Also, a plurality of ADAS applications may be implemented in a plurality of ECUs, such as an ECU in which is implemented an ADAS application that realizes ACC functions, an ECU in which is implemented an ADAS application that realizes an LKA function, and an ECU in which is implemented an ADAS application that realizes an AEB function.

The actuator systems 30 and 40 are one of realization systems for realizing requests for kinematic plans output by the driver assistance system 20. As an example, the actuator system 30 includes a powertrain actuator (an engine, transmission, and so forth) capable of generating braking/driving force in the vehicle, and controls the operations of the powertrain actuator, thereby realizing requests for kinematic plans. Also, as an example, the actuator system 40 includes a brake actuator (hydraulic brakes, electronic parking brakes, etc.) capable of generating braking force in the vehicle, and controls the operations of the brake actuator, thereby realizing requests for kinematic plans. Note that the number of actuator systems installed in the vehicle is not limited in particular.

The manager 10 decides control contents related to motion of the vehicle based on kinematic plan requests accepted from the driver assistance system 20, and outputs requests to the actuator system 30 and/or 40 based on the decided control contents as necessary. Also, the manager 10 distributes the motion request to the actuator systems 30 and/or 40, based on the distribution instruction acquired from the driver assistance system 20 along with the kinematic plan request.

The manager 10 controls the motion of the vehicle, functioning as an ADAS manager (MGR) or a vehicle MGR or the like involved in so-called vehicle motion, or as a part of an ADAS MGR or a vehicle MGR. The manager 10 includes an accepting unit 11, an arbitration unit 12, a calculation unit 13, and a distribution unit 14.

The accepting unit 11 (first accepting unit) accepts a kinematic plan request and distribution instruction output by the applications of the driver assistance system 20. Examples of kinematic plans in the present embodiment include acceleration related to the front-rear direction (longitudinal direction) motion of the vehicle. Further, the accepting unit 11 (second accepting unit) accepts a driving force lower limit (availability lower limit) from the actuator system 30 including the powertrain actuator.

The driving force lower limit is the lower limit value (minimum driving force) of the driving force that can be realized by the powertrain actuator with the accelerator in a fully closed state in which the accelerator pedal is undepressed, at the current gear ratio (gear stage). The request for the kinematic plan and the driving force lower limit accepted by the accepting unit 11 are output to the arbitration unit 12.

The arbitration unit 12 arbitrates requests for a plurality of kinematic plans from the applications of the driver assistance system 20 accepted by the accepting unit 11. Examples of the processing of this arbitration include one kinematic plan being selected from the kinematic plans based on a predetermined selection criterion (e.g., Min selection). Also, a new kinematic plan can be set based on the kinematic plans, as other arbitration processing. At this time, the arbitration unit 12 arbitrates the kinematic plan requests based on the distribution instruction accepted from each of the applications and the driving force lower limit acquired from the actuator system 30. This arbitration will be described later.

The calculation unit 13 calculates a motion request, based on the arbitration results of the requests for the kinematic plans at the arbitration unit 12. This motion request is a physical quantity for controlling the actuator systems 30 and/or 40, and is different from the physical quantity of the request of the kinematic plan. For example, when the request for a kinematic plan (first request) is acceleration, driving force and driving torque can be calculated as the motion request (second request). Thus, the request for acceleration is converted into a request for driving force or driving torque.

The distribution unit 14 distributes the motion request calculated by the calculation unit 13 to at least one actuator system 30 and/or 40. At this time, the distribution unit 14 distributes the motion request to the actuator system instructed by the distribution instruction, which has been accepted by the accepting unit 11 along with the kinematic plan employed as the arbitration result in the arbitration unit 12. For example, when the distribution instruction is a distribution instruction such as using only the engine, the distribution unit 14 distributes all motion requests only to the actuator system 30 including the powertrain actuator. Also, for example, when the distribution instruction is a distribution instruction such as using the engine and the brakes together, the distribution unit 14 appropriately distributes the motion request to the actuator system 30 including the powertrain actuator and the actuator system 40 including the brake actuator.

Note that the above-described configurations of the manager 10, the driver assistance system 20, and the actuator systems 30 and 40, installed in the vehicle are exemplary, and can be added, replaced, changed, omitted, or the like as appropriate. Also, the functions of each piece of equipment can be implemented by integration into one piece of equipment or distribution between or among a plurality of pieces of equipment, as appropriate.

Control

Figure 2:
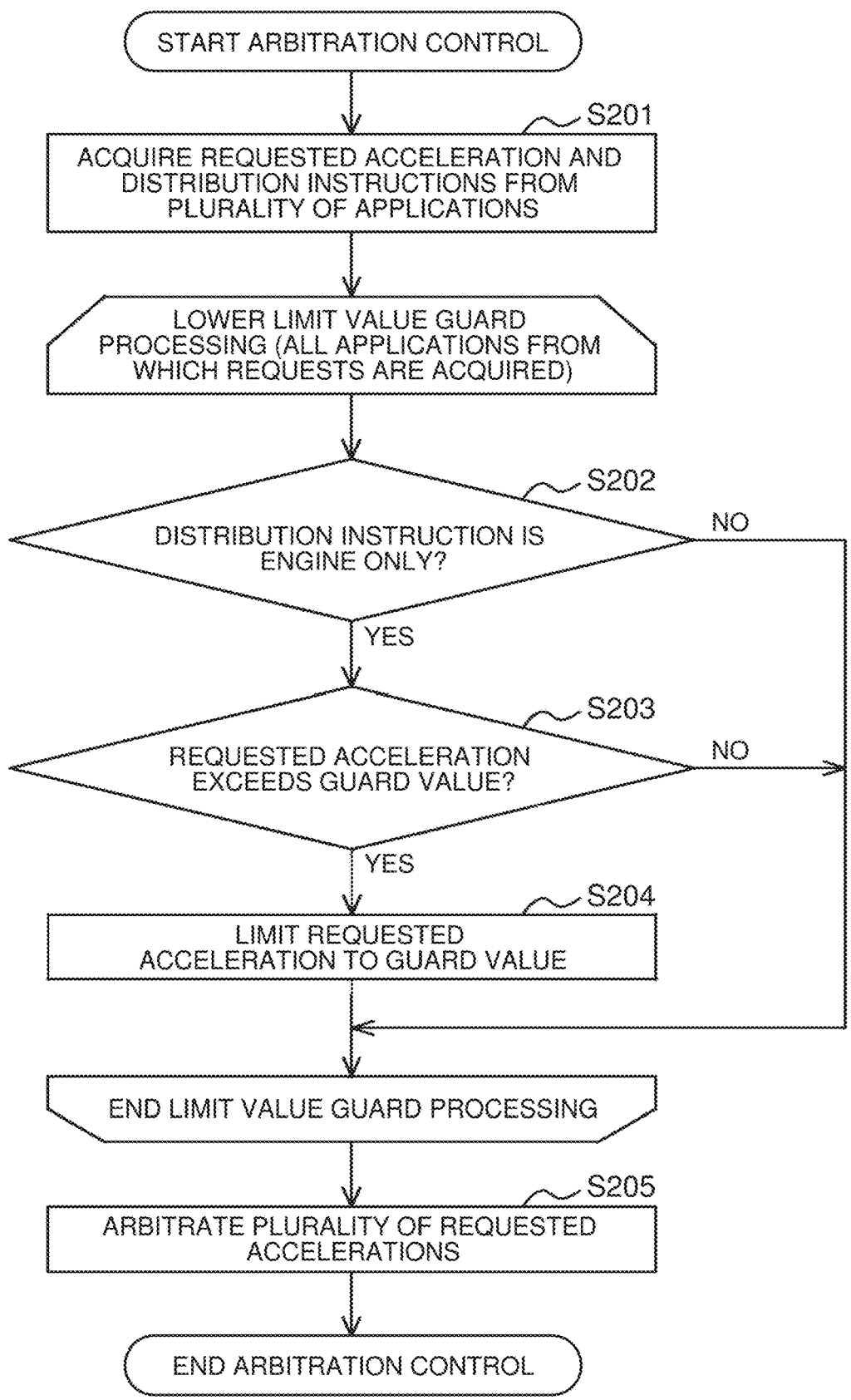
FIG. 2 is a flowchart of a processing procedure of arbitration control executed by an arbitration unit of a manager.

Control executed by the manager 10 according to the present embodiment will be described with further reference to FIG. 2. FIG. 2 is a flowchart showing processing procedures of arbitration control executed by the arbitration unit 12 of the manager 10.

The arbitration control shown in FIG. 2 is started when the accepting unit 11 of the manager 10 accepts a request for a kinematic plan from an application of the driver assistance system 20. In the present embodiment, an example of accepting requested acceleration from the applications as requests of the kinematic plans will be described.

Step S201

The arbitration unit 12 acquires requested acceleration and distribution instructions from the applications, via the accepting unit 11. Upon the arbitration unit 12 acquiring the requested accelerations and distribution instructions from the applications, the processing proceeds to step S202.

Step S202

The arbitration unit 12 determines whether the distribution instruction of the applications is "engine only", in which only usage of the engine, which is an actuator that is affected by the driving force lower limit (availability lower limit) of the powertrain actuator to realize the requested acceleration, is permitted. Examples of distribution instructions "other than engine only" that are different from "engine only" include "brakes only", in which only usage of the brakes, which is an actuator that is not affected by (or less susceptible to) the driving force lower limit of the powertrain actuator, is permitted to realize the requested acceleration, "combination of engine/brakes" in which use of both the engine and the brakes is permitted, and so forth. Of course, distribution instructions may be given using another actuator, besides the brakes, that is not affected by (or is less susceptible to) the driving force lower limit of the powertrain actuator.

When the arbitration unit 12 determines that the distribution instruction of the application is "engine only" (YES in step S202), the processing proceeds to step 5203. On the other hand, when the arbitration unit 12 determines that the distribution instruction of the application is other than "engine only" (NO in step S202), processing is performed for another application regarding which processing has not yet been performed.

Step 5203

The arbitration unit 12 determines whether the requested acceleration of the application exceeds a guard value for the application, of which the distribution instruction is "engine only". This guard value is a value set in order to suppress the effects of arbitration on the application requesting a kinematic plan that exceeds the braking/driving force that can be realized by the vehicle. In the present embodiment, acceleration that is calculated (converted) from the driving force lower limit (availability lower limit) of the powertrain actuator is used as the guard value.

When the arbitration unit 12 determines that the requested acceleration of the application exceeds the guard value (YES in step S203), the processing proceeds to step 5204. On the other hand, when the arbitration unit 12 determines that the requested acceleration of the application does not exceed the guard value (NO in step S203), the processing proceeds to step 5202, and processing is performed for another application regarding which processing has not yet been performed.

Step S204

The arbitration unit 12 limits the requested acceleration of the application that exceeds the guard value to the guard value. That is to say, when the requested acceleration of the application of which the distribution instruction is "engine only" exceeds the guard value, the requested acceleration from the application is replaced with the acceleration of the guard value (limited acceleration). Upon the arbitration unit 12 limiting the requested acceleration of the application to the guard value, the processing proceeds to step S205.

The processing of steps S202 to S204 described above is carried out for all applications regarding which the arbitration unit 12 has acquired requested acceleration as requests for kinematic plans.

Step S205

The arbitration unit 12 arbitrates the requested accelerations requested by the applications. The requested accelerations to be arbitrated include an original requested acceleration requested by an application of which the distribution instruction is "other than engine only", and a limited acceleration in which requested acceleration requested by an application of which the distribution instruction is "engine only" is limited by the guard value. Upon the arbitration unit 12 arbitrating the requested accelerations, the arbitration control ends.

Specific Example

Figure 3:
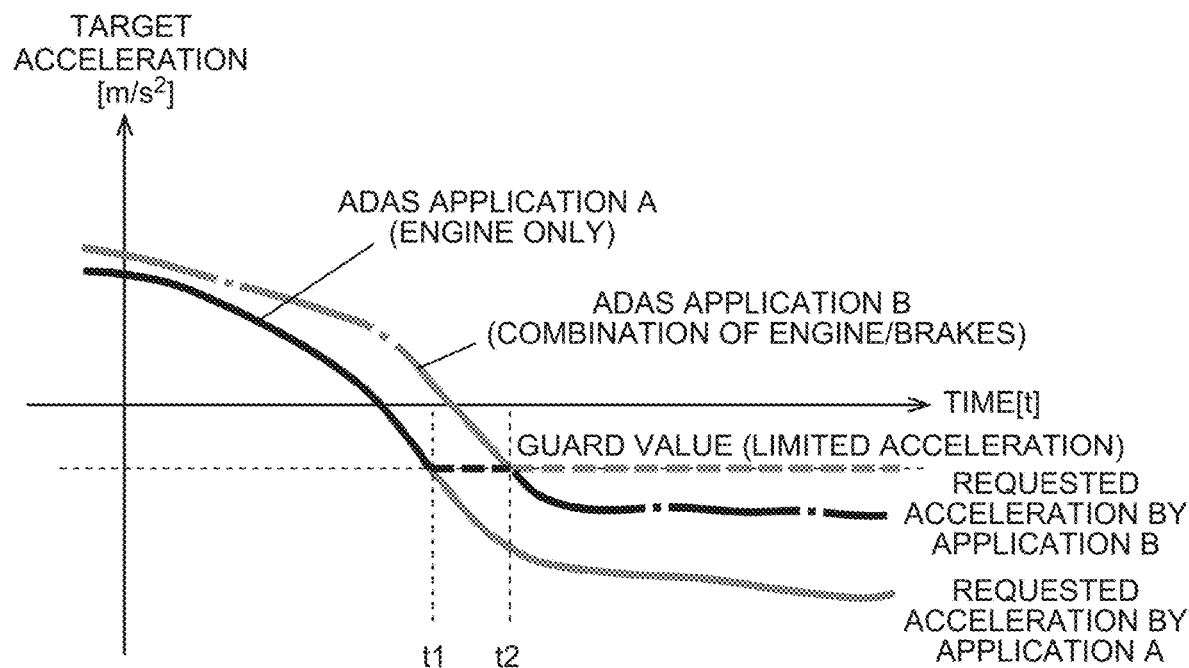
FIG. 3 is a diagram illustrating an example of arbitration of requested acceleration from a plurality of ADAS applications.

FIG. 3 describes in detail an example regarding arbitration (Min selection) of the requested accelerations acquired from the ADAS applications. In FIG. 3, an example is illustrated in which an ADAS application A outputs a requested acceleration by a distribution instruction of "engine only" (continuous line), and an ADAS application B outputs a requested acceleration by a distribution instruction of "combination of engine/brakes" (long dashed short dashed line), respectively.

In a period of time t<t1, the requested acceleration of the ADAS application A of which the distribution instruction is "engine only" does not exceed the guard value (does not become smaller than the guard value). Accordingly, arbitration is performed between the requested acceleration of the ADAS application A (original) and the requested acceleration of the ADAS application B. As a result of the arbitration, the requested acceleration of the ADAS application A, which is the minimum value, is employed (black continuous line).

In the period of t1≤time t<t2, the requested acceleration of the ADAS application A of which the distribution instruction is "engine only" exceeds the guard value (smaller than the guard value), and accordingly the requested acceleration (continuous line) of ADAS application A is limited to the guard value (dotted line). Accordingly, arbitration is performed between the requested acceleration of the ADAS application A that is limited to the guard value and the requested acceleration of the ADAS application B. In the example of FIG. 3, the guard value is still smaller than the requested acceleration of the ADAS application B during this period, and accordingly the guard value (limited acceleration) is employed as the arbitration result (black dotted line).

In the period of time t≥t2, the requested acceleration of the ADAS application A of which the distribution instruction is "engine only" exceeds the guard value (becomes smaller than the guard value), and accordingly the requested acceleration (continuous line) of ADAS application A is limited to the guard value (dotted line). Accordingly, arbitration is performed between the requested acceleration of the ADAS application A that is limited to the guard value and the requested acceleration of the ADAS application B. However, in the example of FIG. 3, the requested acceleration of the ADAS application B is smaller than the guard value during this period, and accordingly the requested acceleration of the ADAS application B is employed as the arbitration result (black long dashed short dashed line). That is to say, in the period in which the request of the ADAS application B should be realized over the request of the ADAS application A, the required acceleration of the ADAS application B is employed by arbitration regardless of the relation in magnitude of the requested accelerations.

Due to the limitation using the guard value described above, in a situation in which the minimum acceleration that can be realized by the vehicle, calculated from the driving force lower limit (availability lower limit) of the powertrain actuator is "$-1 m/s^2$", and the ADAS application A requests a requested acceleration of "$-3 m/s^2$", and ADAS application B requests a requested acceleration of "$-2 m/s^2$", respectively, the request of the ADAS application A is limited to the guard value "$-1 m/s^2$" before the arbitration processing, for example. Thus, a situation can be avoided in which the ADAS application A that uses "engine only" is employed by arbitration in accordance with the relation in magnitude of the requested acceleration alone, and only "$-1 m/s^2$" can be output in the actual vehicle.

Operations and Effects

As described above, in the system according to the embodiment of the present disclosure, the manager accepts, along with kinematic plans (requested acceleration), information (distribution instructions) relating to actuators for which usage is to be permitted to realize the kinematic plans, from the applications of the driver assistance system. This allows the manager to comprehend which actuator system is appropriate to be driven in order to realize the requests of each application.

Also, the manager according to the present embodiment limits, prior to performing arbitration, requests of applications requesting kinematic plans that cannot be realized in the current vehicle situation, based on the requested acceleration and distribution instruction output by each application of the driver assistance system, and the driving force lower limit (availability lower limit) of the powertrain actuator. Accordingly, the manager can arbitrate after replacing the kinematic plan (request acceleration) of each application with realistic contents, so that the kinematic plan requests from the applications can be arbitrated appropriately.

Although an embodiment of the technology according to the present disclosure has been described above, the present disclosure is not limited to a manager installed in a vehicle, and can be understood as being an electronic control unit, a system including an electronic control unit and a manager, a control method executed by a manager including a processor and memory, a control program, a computer-readable non-transitory storage medium storing the control program, a vehicle provided with the manager, and so forth.

The present disclosure is useful in managers and the like installed in vehicles and so forth.

What is claimed is:

1. A manager processor comprising:
    a first accepting unit that accepts a plurality of kinematic plans from a plurality of ADAS applications;
    an arbitration unit that arbitrates the kinematic plans;
    a calculation unit that calculates a motion request based on an arbitration result by the arbitration unit; and a distribution unit that distributes the motion request to at least one actuator system, wherein the first accepting unit accepts information relating to the actuator system to which the distribution unit distributes the motion request from the ADAS applications, along with the kinematic plans, wherein the at least one actuator system operates according to the motion request.

2. The manager processor according to claim 1, wherein:
the distribution unit distributes the motion request to the actuator system based on the information; and
the information is information accepted by the first accepting unit along with the kinematic plan employed as a result of arbitration by the arbitration unit.

3. The manager processor according to claim 2, further comprising a second accepting unit that accepts a driving force lower limit that is able to be generated by the actuator system, wherein, when the kinematic plans accepted by the first accepting unit from the ADAS applications include a kinematic plan that exceeds a guard value based on the driving force lower limit, the arbitration unit replaces the kinematic plan that exceeds the guard value with the guard value, and performs arbitration with a kinematic plan that does not exceed the guard value.

4. The manager processor according to claim 3, wherein:
the driving force lower limit is a lower limit of driving force that is able to be realized by a powertrain actuator at a current gear ratio; and
the at least one actuator system includes a powertrain system including the powertrain actuator and a brake system including a brake actuator.

5. The manager processor according to claim 1, wherein the kinematic plan is acceleration.

6. An electronic control unit that is installed in a vehicle and that implements one or more ADAS applications, the electronic control unit comprising
an output unit that outputs, to a manager processor, a kinematic plan of the ADAS application and information regarding an actuator system to be permitted for use to realize the kinematic plan, wherein the actuator system operates according to a motion request.

7. A system comprising:
a plurality of ADAS applications implemented in one or more electronic control units installed in a vehicle; and
a manager processor, wherein:
the one or more electronic control units include an output unit that outputs, to the manager processor, a plurality of kinematic plans requested by the ADAS applications;
the manager processor includes
an accepting unit that accepts the kinematic plans from the ADAS applications,
an arbitration unit that arbitrates the kinematic plans,
a calculation unit that calculates a motion request based on an arbitration result by the arbitration unit, and
a distribution unit that distributes the motion request to at least one actuator system; and
the accepting unit accepts information relating to the actuator system to which the distribution unit distributes the motion request from the ADAS applications, along with the kinematic plans, wherein the at least one actuator system operates according to the motion request.

8. A control method executed by a computer of a manager processor installed in a vehicle including at least one actuator system, the control method comprising:
accepting each of kinematic plans and information regarding an actuator system to be used to realize the kinematic plans, from a plurality of ADAS applications;
performing arbitration of the kinematic plans;
calculating a motion request based on an arbitration result of the arbitration;
distributing the motion request to the at least one actuator system based on the information; and
operating the at least one actuator system according to the motion request.

9. A computer-readable non-transitory storage medium storing a program that, when executed by a computer of a manager processor installed in a vehicle including at least one actuator system, causes the computer to:
accept each of kinematic plans and information regarding an actuator system to be used to realize the kinematic plans, from a plurality of ADAS applications;
perform arbitration of the kinematic plans;
calculating a motion request based on an arbitration result of the arbitration;
distributing the motion request to the at least one actuator system based on the information; and
operating the at least one actuator system according to the motion request.

10. A vehicle comprising:
a manager processor comprising:
a first accepting unit that accepts a plurality of kinematic plans from a plurality of ADAS applications;
an arbitration unit that arbitrates the kinematic plans;
a calculation unit that calculates a motion request based on an arbitration result by the arbitration unit; and
a distribution unit that distributes the motion request to at least one actuator system, wherein the first accepting unit accepts information relating to the actuator system to which the distribution unit distributes the motion request from the ADAS applications, along with the kinematic plans,
wherein the at least one actuator system operates according to the motion request.

11. A control apparatus installed in a vehicle, the control apparatus comprising one or more processors configured to:
accept a plurality of kinematic plans from a plurality of ADAS applications;
perform arbitration of the kinematic plans;
calculate a motion request based on an arbitration result of the arbitration;
distribute the motion request to at least one actuator system, wherein the one or more processors are configured to accept information relating to the actuator system to which the motion request is distributed, along with the kinematic plans; and
operate the at least one actuator system according to the motion request.

* * * * *